United States Patent [19]

Fukumoto

[11] Patent Number: 5,052,728
[45] Date of Patent: Oct. 1, 1991

[54] LOCK DEVICE FOR KEEPING MOVABLE BODY IN AUTOMOBILE CLOSED

[75] Inventor: Masumi Fukumoto, Yokohama

[73] Assignee: Nifco Inc., Yokohama, Japan

[21] Appl. No.: 560,822

[22] Filed: Jul. 31, 1990

[30] Foreign Application Priority Data

Oct. 18, 1989 [JP] Japan .............................. 1-120967[U]

[51] Int. Cl.⁵ ...................... E05B 65/12; E05C 19/02
[52] U.S. Cl. .............................. 292/106; 292/DIG. 4; 292/DIG. 22; 296/37.12; 224/281; 224/42.45 R
[58] Field of Search ................ 292/DIG. 22, DIG. 4, 292/96, 106; 296/37.9, 37.12 X; 224/281 X, 42.45 R X, 42.44

[56] References Cited

U.S. PATENT DOCUMENTS

| 4,422,522 | 12/1983 | Slavin et al. | 292/DIG. 22 |
| 4,657,292 | 4/1987 | Bruck | 292/DIG. 4 |
| 4,660,881 | 4/1987 | Komeya et al. | 224/281 |
| 4,669,764 | 6/1987 | Bruck | 292/DIG. 4 |
| 4,712,845 | 12/1987 | Nicol | 296/37.9 |
| 4,743,060 | 5/1988 | Hishida | 296/37.12 |
| 4,890,735 | 1/1990 | Fukumoto | 206/1.5 |
| 4,976,350 | 12/1990 | Fukumoto | 206/1.5 |

FOREIGN PATENT DOCUMENTS 2841546 9/1973 Fed. Rep. of Germany ... 292/DIG. 22
2-25332 2/1990 Japan .

Primary Examiner—Eric K. Nicholson
Assistant Examiner—Darnell M. Boucher
Attorney, Agent, or Firm—Oblon, Spivak, McClelland, Maier & Neustadt

[57] ABSTRACT

A lock device for keeping a movable body closed includes a cam lever and an inertia stopper. The cam lever serves to lock the movable body at a closed position by pushing the movable body inward to the closed position against a biasing force and to release the locked state of the movable body by further pushing the movable body inward, thereby permitting the movable body to move to an open position. The inertia stopper serves to prevent the cam lever from releasing the locked state of the movable body when the force of inertia is generated to push the movable body inward from the locked state.

6 Claims, 5 Drawing Sheets

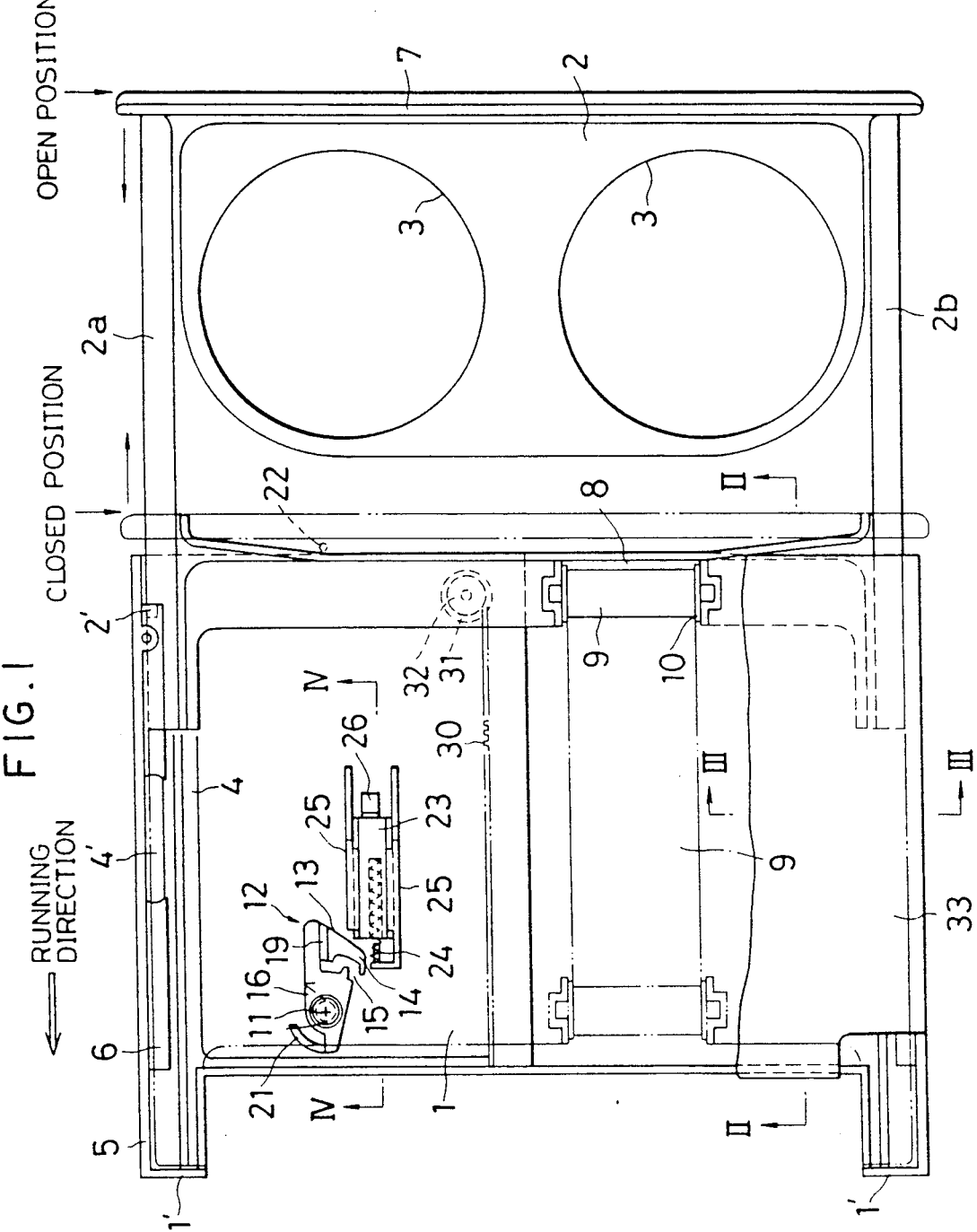

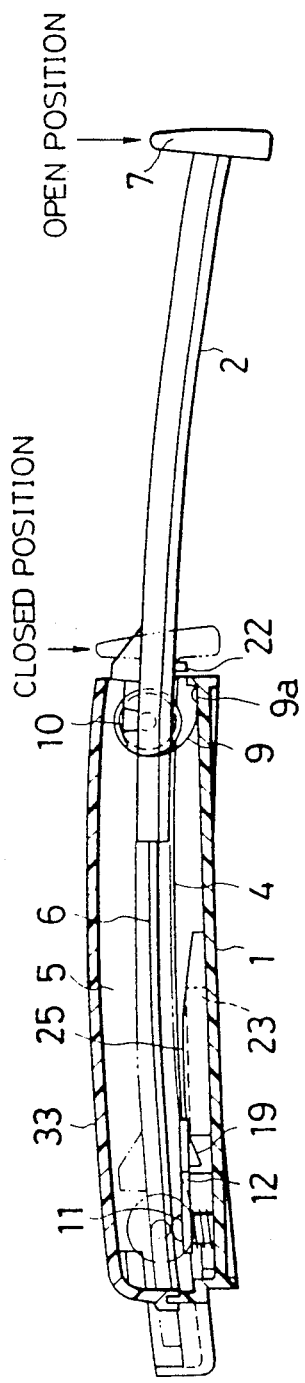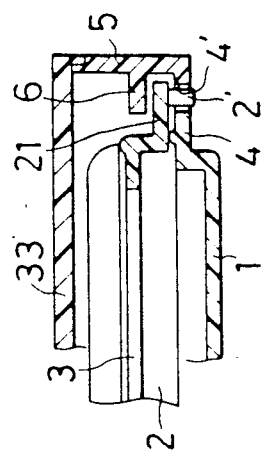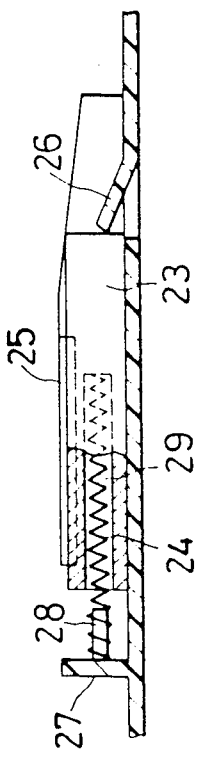

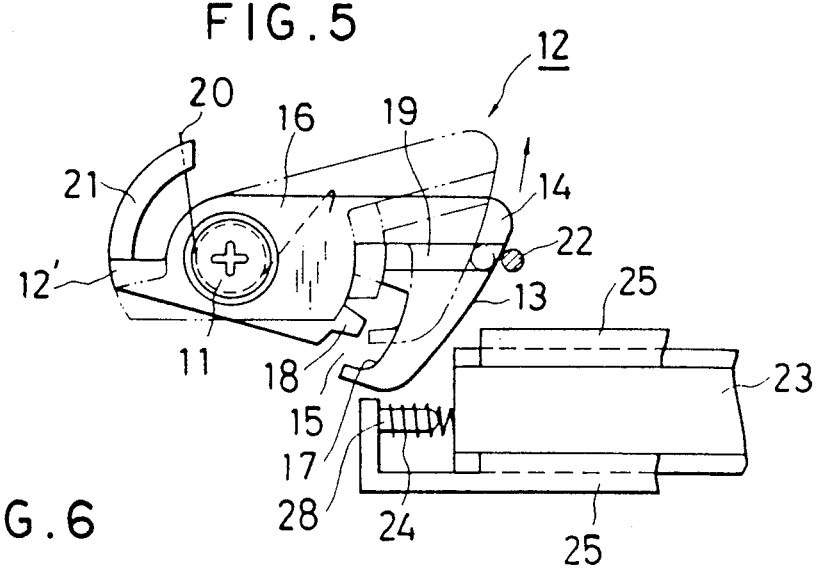
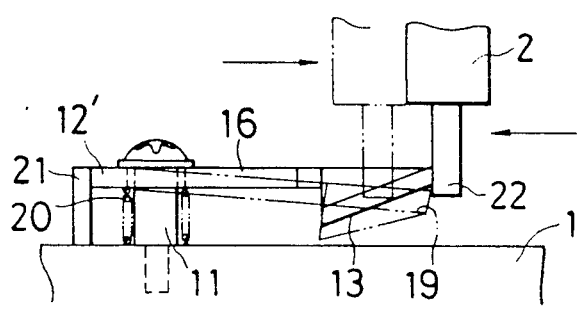
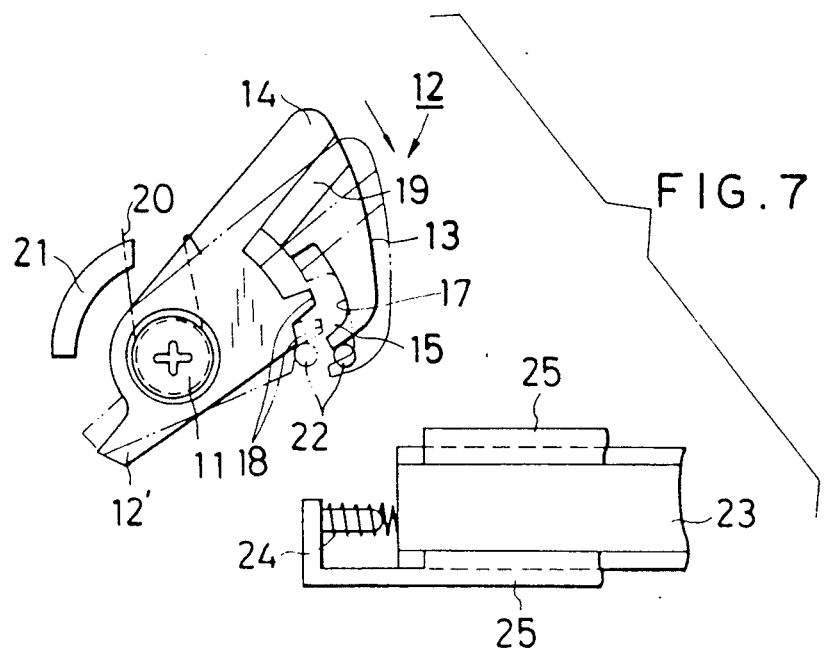

LOCK DEVICE FOR KEEPING MOVABLE BODY IN AUTOMOBILE CLOSED

BACKGROUND OF THE INVENTION

1. Field of the Invention

This invention relates to a lock device for keeping closed an ashtray, compartment for small articles, cup holder, glove compartment or the like (hereinafter referred to as a "movable body") which is installed in an automobile so as to be movable between an open position in use and a closed position in such a manner as being slidable or swingable with the aid of gravitation or a biasing means such as a spring.

2. Prior Art Statement

Japanese Utility Model Public Disclosure No. HEI 2-25332, for example, discloses a lock device for a movable body movable between its open position and its closed position and normally biased toward the open position by biasing means. The conventional lock device is provided with a cam lever swingable about a pivot mounted on an automobile and capable of locking the movable body at the closed position when the movable body is pushed inward against the biasing force of the biasing means and, when the movable body now at the closed position is further pushed inward, releasing the locked state of the movable body, thereby permitting the movable body to move toward the open position.

However, if the cam lever should unlock the movable body at the closed position as a result of further pushing the movable body inward by the force of inertia generated when the automobile stops suddenly or collides against something, the movable body will fly out and may possibly injure the driver or passengers. To avoid this possibility, the conventional lock device further has a construction capable of preventing the cam lever from unlocking the movable body at the closed position by the force of inertia.

To be specific, the conventional lock device has the cam lever provided with a long extension extending over the pivot for the cam lever in a direction opposite to the free end of the cam lever and a transfer member disposed between the extension and a portion of the automobile corresponding in position to the extension. The transfer member is responsive to the force of inertia generated and pushing the movable body at the closed position further inward and is moved against the biasing force of the biasing means to thereby prevent the cam lever from unlocking the movable body.

Thus, according to the conventional lock device, it is possible to effectively prevent the movable body from being moved toward its open position by the force of inertia with the inertia-responsive transfer member. However, since the cam lever is provided with the long extension extending over the pivot for the cam lever and since the inertia-responsive transfer member is required to act on the extension of the cam lever against the biasing force of the biasing means when the force of inertia is generated, it is necessary to leave a large space exclusively for the installation thereof and to mount the inertia-responsive transfer member, which requires considerable labor.

In addition, Japanese Patent Public Disclosure No. 64-41434 (U.S. Pat. No. 4,890,735) discloses a box-like article accommodating apparatus provided with a movable body locking device which comprises a heart-like cam groove, a locking pin having one end thereof inserted in and tracing the cam groove, and an inertia-responsive transfer member moving in response to the force of inertia exerted on the movable body to prevent the movement of the locking pin inserted in the cam groove and prevent the movable body from being moved to its open position. With this lock device, however, since the inertia-responsive transfer member is required to stop the quick and minute movement of the locking pin, if the lock device is of a small size, it will become difficult to reliably stop such quick and minute movement of the locking pin.

OBJECT AND SUMMARY OF THE INVENTION

The present invention has been achieved to eliminate the disadvantages of the conventional lock device.

One object of the present invention is to provide a lock device for keeping a movable body closed, which only requires a small installation space.

Another object of the present invention is to provide a lock device for keeping a movable body closed, which is capable of reliably preventing the movable body from moving toward its open position, even if the lock device is of a small size, when an inertial force is exerted onto the movable body.

To attain the objects described above, according to the present invention there is provided a lock device for keeping closed a movable body mounted in an automobile so as to be movable between an open position and a closed position and normally biased toward the open position, which comprises a cam lever having a free end formed with a slit, swingable about a pivot mounted on an automobile and capable of locking the movable body at the closed position when the movable body is pushed inward against the biasing force and, when the movable body now at the closed position is further pushed inward, releasing the locked state of the movable body, thereby permitting the movable body to move toward the open position; a pin projecting from a bottom surface of the movable body and fitted in the slit of the cam lever when the movable body is pushed inward to the closed position, thereby locking the movable body at the closed position; an inertia stopper mounted on the automobile so as to be movable in a direction in which the automobile runs and, when the force of inertia is exerted to push the movable body at the closed position further inward, coming into contact with the free end of the cam lever to prevent the cam lever from releasing the locked state of the movable body; and biasing means for normally biasing the inertia stopper away from the free end of the cam lever.

In the lock device having the construction as described above, when the movable body at the closed position is pushed further inward by the force of inertia generated when an automobile stops suddenly, the inertia stopper is moved to the lateral side of the cam lever against the biasing force of the biasing means to contact the free end of the cam lever, thereby regulating the rotation of the cam lever and preventing the cam lever from releasing the locked state of the movable body.

According to the lock device of the present invention, as described above, a small exclusive space for the installation of the lock device will suffice because the conventional long extension is not required. Furthermore, the lock device of the present invention can operate reliably even if the lock device is of a small size because the inertia stopper comes into direct contact with the cam lever to prevent the rotation of the cam lever.

The aforementioned and other objects, characteristic features and advantages of the present invention will become more apparent to those skilled in the art as the disclosure of the present invention is made hereinbelow with reference to the accompanying drawings.

BRIEF DESCRIPTION OF THE DRAWINGS

FIG. 1 is a plan view illustrating one embodiment of the lock device according to the present invention in which a movable body is at its open position.

FIG. 2 is a sectional view taken along line II—II in FIG. 1.

FIG. 3 is an enlarged sectional view taken along line III—III in FIG. 1.

FIG. 4 is an enlarged sectional view taken along line IV—IV in FIG. 1.

FIG. 5 is an explanatory plan view illustrating one positional relation between a cam lever and an inertia stopper of the embodiment.

FIG. 6 is a side view of the cam lever of FIG. 5.

FIG. 7 is an explanatory plan view illustrating a positional relation between the cam lever and the inertia stopper assumed when the moveable body is pushed inward to its closed position.

DETAILED DESCRIPTION OF THE PREFERRED EMBODIMENT

Figure 8:
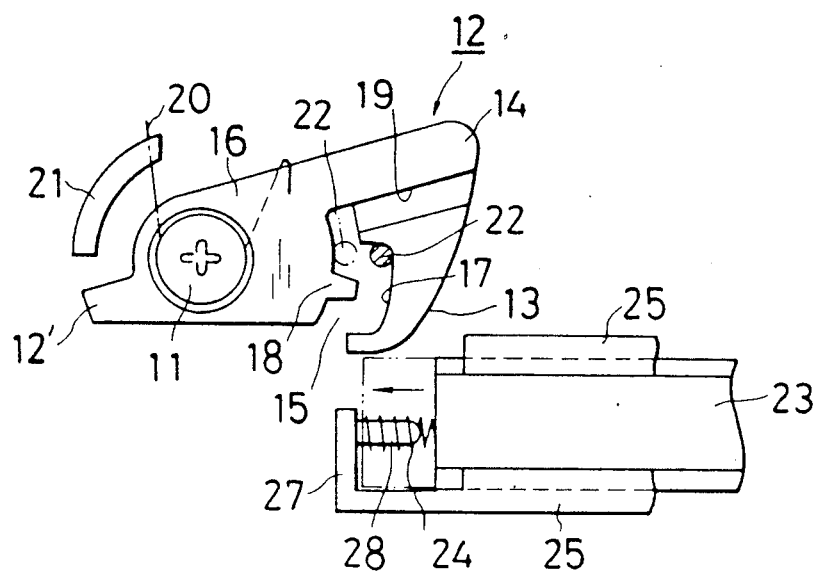
FIG. 8 is an explanatory plan view illustrating another positional relation between the cam lever and the inertia stopper assumed when the movable body is locked at its closed position.

The drawings illustrate one embodiment of the lock device for keeping a movable body closed. In the drawings, reference numeral 1 designates a base plate (a housing) fixed within an automobile compartment (not shown) and numeral 2 designates a movable body retained so as to be slidable forward and backward on the base plate 1. In the illustrated embodiment, the movable body 2 is a platelike cup holder having two holes 3 for permitting partial insertion of a cup (not shown) therethrough and supporting the cup therein in a suspended state.

As illustrated in FIG. 1 to FIG. 3, the base plate 1 has two raised portions 4 formed one each on the opposite lateral sides thereof for placing thereon a right side portion 2a and a left side portion 2b of the movable body 2, two side walls 5 each formed upright from the outside of the raised portion 4 for contacting the outer edges of the right and left side portions 2a and 2b of the movable body 2, and two guides 6 each formed on the side wall 5 to extend over substantially the entire length of the side wall 5 so that these guides 6 contact the right and left side portions 2a and 2b of the movable body 2 from above. With the structure of the base plate, the movable body 2 is smoothly slidable forward and backward in such a fashion as being slightly apart from the upper surface of the base plate 1, with the right and left side portions 2a and 2b guided by the raised portions 4, side walls 5 and guides 6.

The movable body 2 has a front end provided integrally with an operation plate 7 of a width substantially the same as the width of the movable body 2 for pushing the movable body 2 inward and a rear end formed with an elongated slot 8 extending in the direction of the width of the movable body 2. In the slot 8 there is mounted a rotatable spool 10 having a spiral spring 9 wound therearound. The spiral spring 9 has its terminal end secured to the front end of the base plate 1 with a screw 9a or the like to bias the movable body 2 to its open position apart from the base plate 1 by its spirally contracted force. Each of the raised portions 4 of the base plate 1 has a slit 4' extending substantially over the entire length thereof, whereas each of the right and left side portions 2a and 2b of the movable body 2 has a projection 2' extending from the bottom surface thereof and projecting into the slit 4'. When the projections 2' abut on the respective front edges of the slits 4', the movable body 2 is stopped at its open position. The base plate 1 is fixed to a deep portion of a front opening in a dashboard of an automobile. When the movable body 2 is used, it projects outwardly from the front opening of the dashboard at its open position. Cups containing beverages therein are held in the holes 3 of the movable body 2 in a suspended state without spilling the beverages. When the movable body 2 is not used, it is pushed inward to its closed position with the operation plate 7, thereby closing the opening of the dashboard with the operation plate 7 without impairing the good appearance of the dashboard.

The base plate 1 is provided with a cam lever 12 for locking the movable body 2 at its closed position. The cam lever 12 has its rear end pivotally supported on a pivot 11 mounted on the rear portion of the base plate 1 and its free front end directed toward the front of the base plate 1.

As illustrated in FIG. 8, the cam lever 12 comprises a sickle-shaped front portion 14 having a front inclined surface 13 and a rear portion 16 spaced apart from the front portion 14 by a slit 15 open at one end behind a backward end of the front inclined surface 13 and closed at the other end. The rear surface of the front portion 14 is formed with a recess 17 not reaching the closed end of the slit 15. The rear portion 16 has a protuberance 18 projecting slightly into the recess 17 of the front portion 14. The front portion 14 has a straight upward slope 19 beginning from the closed end of the slit 15 or a position in the vicinity of the recess 17 of the front portion 14 and terminating in the front inclined surface 13 of the front portion 14, with the bottom of the slope 19 at the front inclined surface 13 substantially flush with the surface of the front portion 14.

As illustrated in FIG. 6, the pivot 11, on which the cam lever 12 is supported rotatably and aslant movably, has a coil spring 20 fitted therearound below the cam lever 12. One end of the coil spring 20 is engaged with the cam lever 12, whereas the other end thereof is engaged with the base plate 1, e.g. with a stopper 21 projecting upwardly from the base plate 1. Thus, the coil spring 20 biases the cam lever 12 to be rotated in the clockwise direction in FIG. 1 and lifted in the upward direction in FIG. 6. Therefore, when a rear projection 12' of the cam lever 12 abuts on the stopper 21 of the base plate 1 by the clockwise biasing force of the coil spring 20, the cam lever 12 is kept horizontal substantially in parallel to the base plate 1 by the upward biasing force of the coil spring 20 and, in this state, the straight upward slope 19 is directed in the lengthwise direction of the base plate 1 as illustrated in FIGS. 1 and 5. When the front inclined surface 13 of the cam lever 12 is pushed downwardly, with the pivot 11 as a fulcrum, against the upward biasing force of the coil spring 20 until it abuts on the upper surface of the base plate 1, as shown by the dotted line in FIG. 6, the straight upward slope 19 becomes substantially horizontal.

The movable body 2 is provided on the rear portion thereof with a pin 22 projecting downward. The operation of the pin 22 will be described in detail with reference to FIG. 5 and FIGS. 7 to 9.

Figure 9:
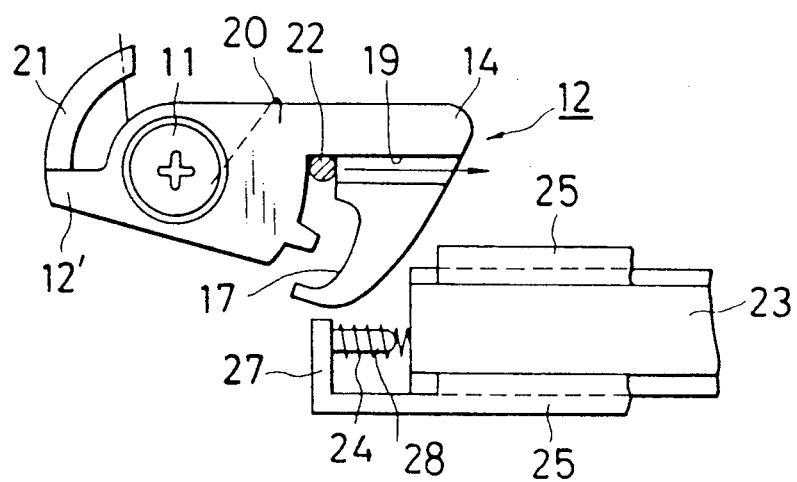
FIG. 9 is an explanatory plan view illustrating still another positional relation between the cam lever and the inertia stopper assumed when the movable body is pushed further inward.

When the movable body 2 at its open position shown in FIG. 1 is pushed inward toward its closed position against the spirally contracted force of the spiral spring 9, then the pin 22 abuts on the terminal end of the straight upward slope 19 of the front inclined surface 13 of the cam lever (FIG. 5). However, since the cam lever 12 is kept horizontal, the pin 22 does not enter the straight upward slope 19 but pushes the front inclined surface 13, with the result that the cam lever 12 is rotated in the counterclockwise direction against the clockwise biasing force of the coil spring 20 as indicated by the arrow in FIG. 5. With the rotation of the cam lever 12, the pin 22 moves along the front inclined portion 13, passes through the backward end of the front inclined portion 13 and reaches the open end of the slit 15. As a result, the cam lever 12 is rotated slightly in the clockwise direction by the clockwise biasing force of the coil spring 20, and the pin 22 slightly enters the slit 15 and abuts on the protuberance 18 (FIG. 7). Whether the pin 22 has passed through the backward end of the front inclined surface 13 can be confirmed from the fact that the movable body 2 can no longer be pushed inward owing to the abutment of the rear end of the movable body 2 on the rear end 1' of the base plate 1, for example. When the application of the pushing force to the operation plate 7 is released upon receiving the aforementioned confirmation, the movable body 2 is moved slightly toward its open position by the spirally contracted force of the spiral spring 9 and the cam lever 12 is slightly rotated in the clockwise direction by the clockwise biasing force of the coil spring 20, with the result that the pin 22 is engaged in the recess 17 (FIG. 8). At this time, the movable body 2 stops. In this state, the movable body 2 is at its closed position to close the opening of the dashboard with the operation plate 7. The movable body 2 held at its closed position can be brought to its open position by pushing it inward through the operation plate 7 to cause the pin 22 to escape from the recess 17 formed in the rear surface of the sickle-shaped front portion 14 of the cam lever 12, thereby rotating the cam lever 12 in the clockwise direction with the clockwise biasing force of the coil spring 20 until the rear projection 12' abuts on the stopper 21 and positioning the pin 22 at the closed end of the slit 15 (FIG. 9). Since the movable body 2 is biased to its open position by the spiral spring 9, the pin 22 enters the straight upward slope 19 directed in the lengthwise direction of the base plate 1 from the beginning end having a large depth, pushes the cam lever 12 down against the upward biasing force of the coil spring 20, moves toward the terminal end of the straight upward slope 19, passes through the slope 19 and stops when the movable body 2 reaches its open position. The cam lever 12 pushed down during the movement of the pin 22 on the straight upward slope 19 is returned to its horizontal posture by the upward biasing force of the coil spring 20 upon the pin 22 having passed through the slope 19.

When an automobile having the movable body 2 installed therein stops suddenly or collides against something, the force of inertia generated may possibly push the movable body 2 held at its closed position to thereby bring the movable body 2 to its open position in the same manner as in the case of the aforementioned manual operation. In order to eliminate this possibility, the base plate 1 is provided thereon with a parallelepiped inertia stopper 23 which is located in front of the front inclined surface 13 of the cam lever 12, held movable in the lengthwise direction of the base plate 1 (i.e. in the direction in which the automobile runs) and normally biased to the right in FIG. 1 by a coiled spring 24 so as not to act on the cam lever 12.

To be specific, the inertia stopper 23 has a blind hole 29 formed therein from the rear end thereof and is formed of lead or the like material of an elongated shape so as to be immediately responsive to the force of inertia. As illustrated in FIGS. 1 and 4, a pair of opposed L-shaped guides 25 are raised from the upper surface of the base plate 1 so as to guide the lengthwise movement of the inertia stopper 23, a tongue-like member 26 is raised aslant between the L-shaped guides 25 from the upper surface of the base plate 1 in the backward direction so as to receive the front end of the inertia stopper 23 biased by the coiled spring 24, and an upright wall 27 is raised from the upper surface of the base plate 1 so as not to interfere with the movement of the cam lever 12 and has a small projection 28 directed to the blind hole 29 of the inertia stopper 23. One end of the coiled spring 24 is fitted on the small projection 28 and the other end thereof is received on the bottom of the blind hole 29. Thus, while the inertia stopper 23 is biased toward the tongue-like member 26 by the coiled spring 24, it is movable between the tongue-like member 26 and the upright wall 27 with the pair of L-shaped guides 25. When the inertia stopper 23 is moved to the upright wall 27, the small projection 28 is inserted into the blind hole 29 of the inertia stopper 23.

The inertia stopper 23 and coiled spring 24 can easily be mounted by fitting one end of the coiled spring 24 about the short projection 28, causing the inertia stopper 23 to press the tongue-like member 26 down, inserting the inertia stopper 23 between the L-shaped guides 25, with the other end of the coiled spring 24 accommodated within the blind hole 29 of the inertia stopper 23, until the front end of the inertia stopper 23 passes through the free end of the tongue-like member 26.

The force of inertia generated when the automobile stops suddenly or collides against something, with the movable body 2 held at its closed position, i.e. having the pin 22 thereof received in the recess 17 of the cam lever 12, causes the inertia stopper 23 to move toward the upright wall 27 against the biasing force of the coiled spring 24 to bring one side of the inertia stopper 23 into slide contact with the side surface of the backward end of the front inclined surface 13 of the cam lever 12 as shown by the phantom line in FIG. 8 and, at the same time, causes the movable body 2 to be pushed inward to permit the pin 22 to escape from the recess 17 as shown by the phantom line in FIG. 8. At this time, however, since the cam lever 12 cannot return its posture to that shown in FIG. 9, the pin 22 of the movable body 2 cannot enter the straight upward slope 19 and, therefore, the movable body 2 cannot move to its open position. Thus, the movable body 2 is kept closed. As soon as the automobile is free from the force of inertia, the movable body 2 moves slightly toward its open position by the biasing force of the spiral spring 9 to return the pin 22 to the position within the recess 17 of the cam lever 12, thereby holding the movable body 2 at its closed position, while the inertia stopper 23 moves away from the cam lever until front end thereof abuts on the tongue-like member 26 by the biasing force of the coiled spring 24. As a result, the movable body 2 can be moved to its open position again by pushing the movable body 2 held in its closed position inward through the operation plate 7.

Figure 10:
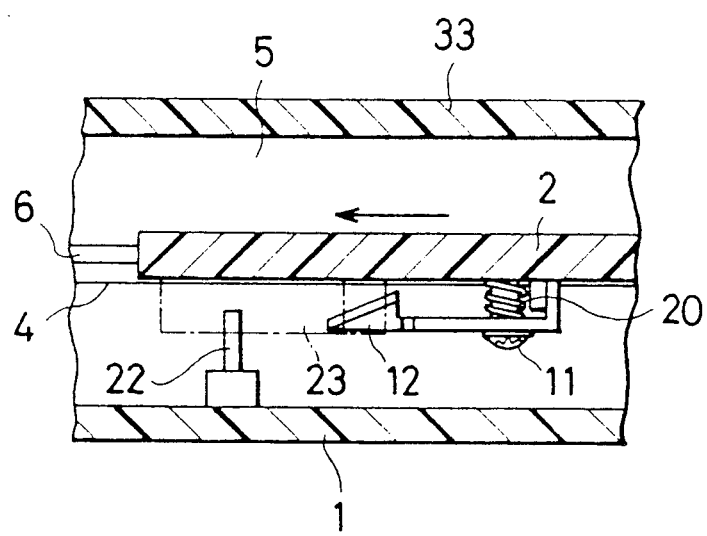
FIG. 10 is a cross-sectional view illustrating the essential part of another embodiment of the lock device according to the present invention.

In the embodiment described above, the cam lever 12 and inertia stopper 13 are mounted on the base plate 1 fixed within the automobile and the pin 22 engageable with the cam lever 12 is mounted on the movable body 2. However, this arrangement is by no means limitative and, as illustrated in FIG. 10, the cam lever 12 and inertia stopper 13 may be provided on the side of the movable body 2 and the pin 22 may be provided so as to project from the side of the base plate 1, whereby substantially the same effects as those of the previous embodiment may be obtained.

Since the movable body 2 moves in a substantially horizontal posture between its open position and its closed position, in this embodiment, it is biased toward its open position by the spiral spring 9. However, in the case where the movable body 2 is an ashtray or glove compartment of a swing type which swings about a pivot and falls to its open position, gravitation can be utilized in place of the spiral spring 9 in bringing the movable body to its open position.

As illustrated in FIG. 1, the movement of the movable body 2 toward its open position by the biasing force of the spiral spring 9 may be braked by mounting a rack 30 on the upper surface of the base plate 1 in the lengthwise direction of the base plate 1, attaching to the lower surface of the movable body 2 a rotary damper 32 having a shaft to which a pinion 31 is fixed so as to be in mesh with the rack 30, and utilizing the rotary damper 32. Reference numeral 33 in FIG. 1 designates an upper wall placed on the opposite side walls 5 of the base plate 1.

According to the present invention, as described above, since the inertia stopper is brought into contact with the side surface of the backward end of the cam lever by the force of inertia, the cam lever is thereby prevented from unlocking the movable body at its closed position. Therefore, a cam lever of a small length mountable within a small space will suffice, and the inertia stopper and coiled spring for biasing the inertia stopper can be easily mounted with exactitude without hindrance from the cam lever.

What is claimed is:

1. A lock device for keeping closed a movable body mounted in an automobile so as to be movable between an open position and a closed position and normally biased toward the open position, comprising:
    a cam lever having a free end formed with a slit, swingable about a pivot mounted on one or the other of the automobile and the movable body, and capable of locking the movable body at the closed position when the movable body is pushed inward against the biasing force and, when the movable body now at the closed position is further pushed inward, releasing the locked state of the movable body, thereby permitting the movable body to move toward the open position;
    a pin permitting from the other of the automobile and the movable body and fitted in said slit of said cam lever when the movable body is pushed inward to the closed position, thereby locking the movable body at the closed position;
    an inertia stopper mounted on one or the other of the automobile and the movable body, on which said cam lever is mounted, so as to be movable in a direction in which the automobile runs and, such that if a force of inertia is exerted to push the movable body at the closed position further inward, said inertia force brings said inertia stopper into contact with said free end of said cam lever to prevent said cam lever from releasing the locked state of the movable body; and
    biasing means for normally biasing the inertia stopper away from said free end of said cam lever.

2. A lock device according to claim 1, wherein said inertia stopper is disposed so as to come into slide contact with one side surface of said cam lever when the force of inertia is exerted.

3. A lock device according to claim 2, wherein said inertia stopper is made of lead and formed in the shape of a parallelepiped.

4. The lock device according to claim 1, wherein said movable body includes a compartment which is accessible when said movable body is in said open position.

5. The lock device according to claim 1, further comprising a base plate mounted in said automobile, said base plate slidably supporting the movable body thereon.

6. The lock device according to claim 5, wherein said cam lever and said inertia stopper are mounted on said base plate.

* * * * *